July 24, 1934.  A. O. ABBOTT, JR  1,967,853
CUTTING APPARATUS
Original Filed July 30, 1927   2 Sheets-Sheet 1

INVENTOR.
ADRIAN O. ABBOTT, JR.
BY Walter L. Pipes
ATTORNEY

July 24, 1934.　　　A. O. ABBOTT, JR　　　1,967,853
CUTTING APPARATUS
Original Filed July 30, 1927　2 Sheets-Sheet 2
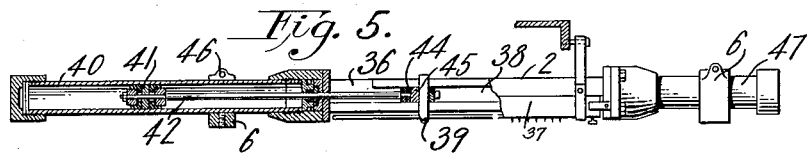
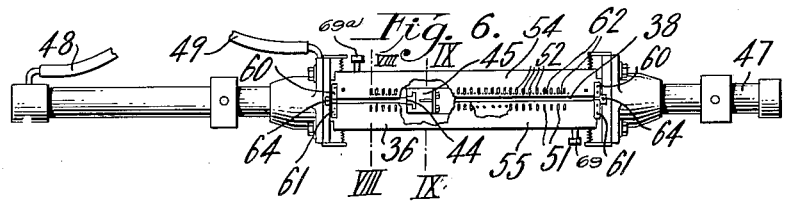
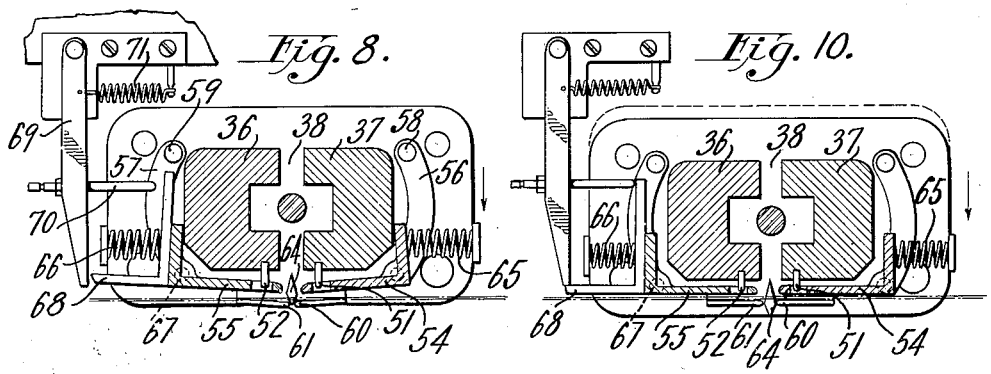
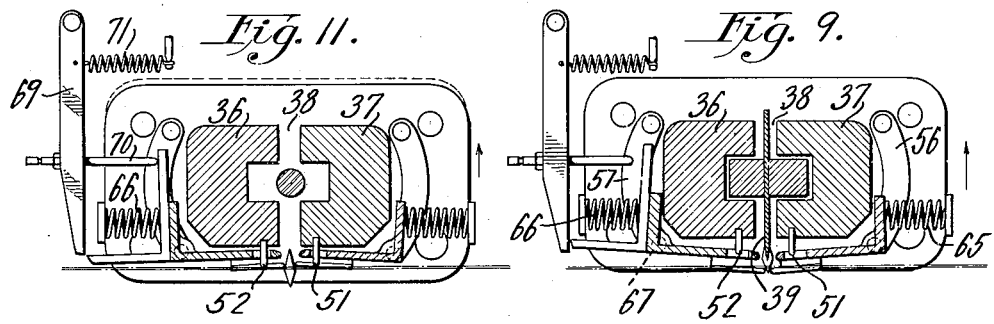
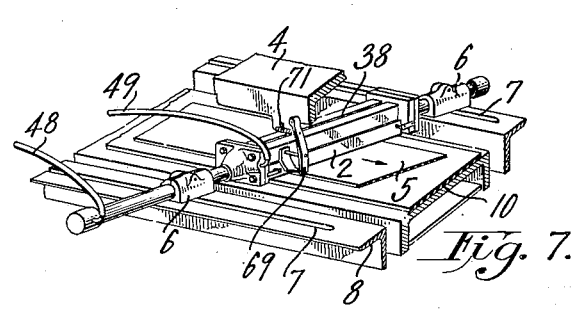
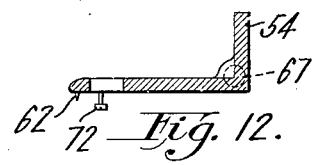
INVENTOR.
ADRIAN O. ABBOTT, JR.
BY
ATTORNEY Patented July 24, 1934

1,967,853

UNITED STATES PATENT OFFICE 1,967,853

CUTTING APPARATUS

Adrian O. Abbott, Jr., Grosse Point Park, Mich., assignor to Morgan & Wright, Detroit, Mich., a corporation of Michigan Original application July 30, 1927, Serial No. 209,564. Divided and this application October 21, 1930, Serial No. 490,179

9 Claims. (Cl. 164—73)

My invention relates to cutting devices, and more particularly to cutting devices for severing measured lengths of material.

The present application is a division of Letters Patent No. 1,961,725, issued June 5, 1934.

In the manufacture of many devices it is necessary to cut and measure one or more strips of material preparatory to incorporation in a finished article. An example of this is in the tire industry where fabric, and particularly bias cut fabric, usually of the weftless type is applied in plies or layers during the assembly of a tire carcass.

I provide cutting means for severing measured lengths of fabric and/or other strip material. The material is fed beneath a frame carrying a cutter. When the measured length of material has passed the cutter it is preferably stopped, the cutter is lowered into engagement with the fabric and grips the same to hold it against creepage during the severing or cutting operation. At the end of the cutting operation the frame is withdrawn from engagement with the fabric and another length fed into position for subsequent cutting. Provision is made for automatically moving the cutting device relative to the fabric.

Where it is desired to simultaneously cut a plurality of lengths from separated substantially parallel extending bodies of material, a plurality of cutting units may be placed side by side and/or in superimposed position. If the different lengths of fabric need be reversed as to the direction of the bias or the cuts, the different cutting units may be disposed with their axis in angular relation to each other. The latter condition is possible where superimposed plies of bias cut fabric have their adjacent extremities extending in opposite directions, as in tire assemblies.

The accompanying drawings illustrate a present preferred embodiment of the invention, in which Figure 1 is a plan view of a cutting mechanism having a plurality of cutting units disposed in angular relation;

Fig. 5 is a side view partially in elevation and partially in section of a cutting unit;

Fig. 6 is a bottom plan view thereof;

Fig. 7 is a perspective view of a cutting unit and cooperating supporting and conveying parts;

Fig. 8 is a cross sectional view of the cutting unit taken substantially along the section line VIII—VIII of Fig. 6;

Fig. 9 is a similar view taken substantially along the section line IX—IX of Fig. 6;

Fig. 10 is a view similar to Fig. 8 illustrating a subsequent relative position of the parts;

Fig. 11 is a view illustrating another relative position of the parts; and

Fig. 12 is a detail view of one of the gripping members.

Figure 1:
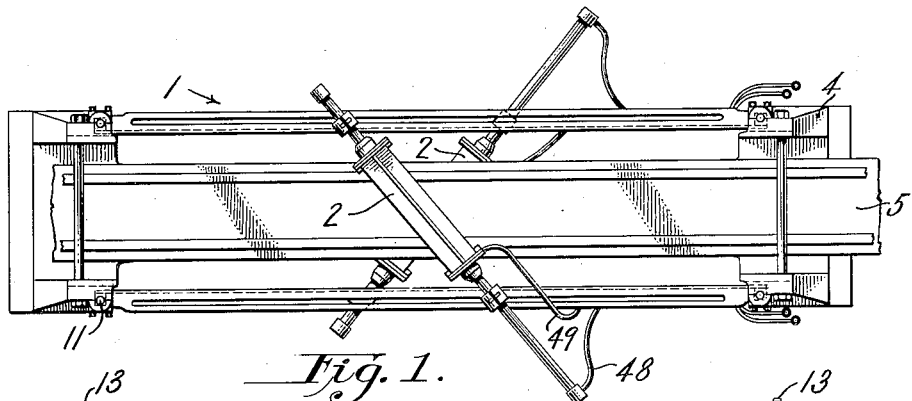
Figure 2:
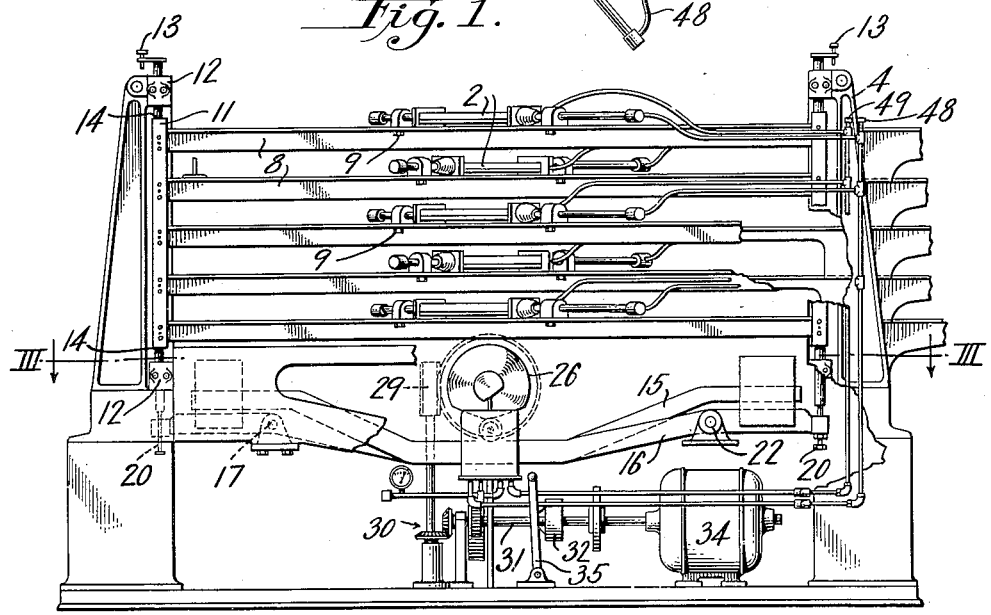
Fig. 2 is a broken side elevational view thereof.
Figure 3:
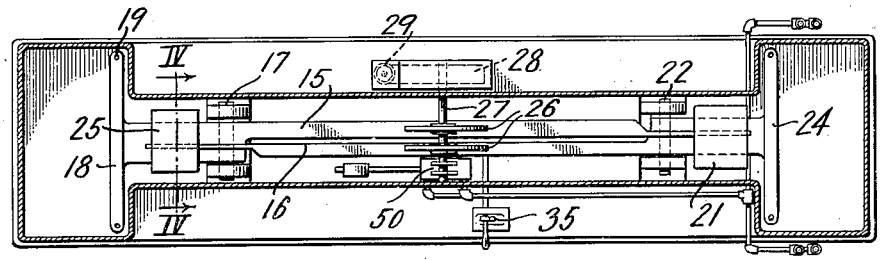
Fig. 3 is a sectional view taken substantially along the section line III—III of Fig. 2.

Referring particularly to Figs. 1, 2 and 7, a cutting mechanism 1 comprises one or more cutting units 2 each of which is similarly mounted on a frame 4. The number of the cutting units 2 mounted on each frame varies in accordance with the number of strips of material which are to be severed at one time. In Fig. 2, I have illustrated five of the units 2 mounted on the frame 4. As shown in Fig. 1, the units 2 may be mounted with their axes set at distant angles to each other so that different fabric strips 5 may be provided with oppositely extending tapered edges. This is particularly advantageous where it is desired to cut different strips of fabric, which are to be superimposed in a finished article with the cords of adjacent plies extending in angular relationship. Where weftless fabric is used for different plies of tire and the cords extend in different directions in adjacent plies, it is desired to cut the strips between the cords.

Referring particularly to Fig. 7, each cutter 2 is provided with bearings 6 which are slidably mounted in slots 7 in frame members 8 by means of clamping screws or nuts 9, illustrated in Fig. 2. The bearings 6 may be mounted at any suitable angle to the axis of a conveyor 10 on which the strip material 5 is advanced.

Figure 4:
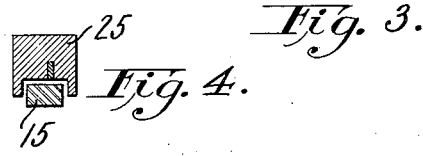
Fig. 4 is a transverse sectional view taken substantially along the section line IV—IV of Fig. 3.

For simultaneously bringing the cutting units 2 into engagement with the several strips of fabric, the frame members 8 are secured to posts 11 which are longitudinally slidable in bearings 12 of the frame 4. Shoulders 14 on the posts and set screws 13 may be provided for limiting the longitudinal movement of the posts. The posts are actuated by levers 15 and 16 extending longitudinally of the cutting mechanism. The lever 15 is pivotally supported on a pin 17 carried by the frame 4. The end of the lever 15 adjacent the pin 17 terminates in a crosshead 18. Openings 19 are provided at the ends of the crosshead for the reception of extensions 20 on the posts 11 at that end of the cutting mechanism. A counterweight 21 is provided at the opposite end of the lever which counterweight 21 is insufficient to lift the associated posts 11. Similarly, the lever 16 is carried by a pin 22 and terminates in a crosshead 24 for engaging extensions 20 on the adjacent posts 11. A counterweight 25 is provided on the opposite end of the lever 16 which counterweight overhangs the lever 15 as shown in Fig. 4.

With the foregoing structure the cutting units 2 tend to drop down onto the fabric strips beneath them under the influence of the force of gravity. For sustaining the cutting units 2, cams 26 are provided for engaging the upper surfaces of the levers 15 and 16. When the full faces of the cams engage the levers 15 and 16 the cutters 2 are in elevated positions; but when the cut away portions of the cams come into engagement with the levers the cutters are permitted to fall.

The cams 26 are carried by a shaft 27 which is driven by a gear 28 meshing with a worm wheel 29 which in turn is connected through a chain of gears 30 to a shaft 31. The shaft 31 is provided with a clutch 32 for selectively connecting it to a motor 34. The clutch 32 is controlled by a handle 35 so that an operator may control the raising and lowering of the cutting units 2. It is to be understood that suitable means are provided for periodically advancing the strip material 5.

As each of the cutting units is similar a description of one only is given. Referring to Figs. 5 to 12 inclusive, the cutting unit 2 comprises parallel members 36 and 37 spaced sufficiently to provide a slot 38 through which a cutting blade 39 moves longitudinally of these members to sever the strips of material. At one end of the members 36 and 37 a cylinder 40 is secured and in which there is a piston 41 mounted on a piston rod 42. The end of the piston rod 42 opposite from the piston 41 is attached to a socket 44 which in turn fits into a socket 45 in which is mounted the cutting blade 39.

One of the bearings 6 fits about the cylinder 40 and is secured in position longitudinally thereof by a clamping screw 46, or other suitable means, and the assembly is fixed on the frame 4 by the screws 9, previously referred to. At the opposite end of the members 36 and 37 there is a supporting arm 47 which passes through the corresponding bearing 6.

The cutting blade is reciprocated longitudinally in the slot 38 by admitting air alternately to the cylinder ends through lines 48 and 49, the line 48 exhausting while air is entering through line 49 and vice versa. The admission of fluid under pressure to the pipe lines 48 and 49 is controlled by a cam operated valve 50 which is also under the control of the shaft 27. Fluid under pressure is delivered to the valve 50 from any suitable source not shown. It is to be understood that where a plurality of the cutter units 2 are assembled in the same cutting mechanism all of the cutters are controlled by the single valve 50.

Strip pins 52 are mounted in the under faces of the member 36 and similar pins 51 are mounted in the member 37. The strip pins 51 and 52 project through openings in angle plates 54 and 55 respectively. The angle plates 54 and 55 are mounted on swinging arms 56 and 57 which are respectively pivoted at 58 and 59. Guide plates 60 and 61 are respectively attached to the margins of the plates 54 and 55. Plate 54 is provided with pins 62 which are adapted to grip the stock in a manner which will be presently described. A cam 64 is mounted at the end of the frame members 36 and 37 and is interposed between the edges of the plates 60 and 61. Springs 65 and 66 act between the upright portions of the plates 54 and 55 to normally press these portions about their pivotal connections 67 with their corresponding supporting arms. This turning movement normally presses the plates inwardly thus depressing the inner ends of the horizontal portions of the plates. An angle plate 68 is provided on the plate 55 and an arm 69 pivotally mounted on the frame 4 is adapted to engage the plate 68 to hold the plate 55 for a short period until it is released by a pin 70. The arm 69 is drawn inwardly by a spring 71. The pin 70 engages the upper end of the plate 68 in such a manner as to throw the end of the arm 69 off from the other end of the plate during relative longitudinal movement between the vertical arm of the plate 68 and the arm 69, as hereinafter described.

The operation of the cutting unit 2 is shown in detail in Figs. 8, 9, 10 and 11. Fig. 8 shows the position of the parts when the cutter is above the stock and ready to descend for the cutting operation. As the cutting unit is lowered in the manner previously described, the inner marginal portions of the plates 54 and 55 come in contact with the stock and grip the same on opposite sides of the line of cut, the pins 62 on the plate 54 being forced into the stock. As the downward movement continues the cam 64 spreads these plates against the springs 65 and 66 about the pivots 67 and 58 and 59 through the medium of the plates 60 and 61 which engage the wedge shaped upper portion of the cam. This brings the stock under tension in the path of the cutter. Only the inner marginal portion of the angle plate 55 bears upon the stock. At this point the arm 69 has slipped over the plate 68 preventing the plate 55 from going back at once. A similar device 69a at the opposite end of the cutting member similarly acts upon the plate 54. The parts are then in approximately the position shown in Fig. 10 in which the distance between the broken line and the top of the cutting unit indicates the relative amount of descent of the cutting unit.

The cutter 39 is then forced across the stock by the admission of air to the cylinder 40 through the line 48 and the stock is cut. The cutting unit then moves upwardly, as indicated in Fig. 11. The arms 69 and 69a hold the angle plates down thereby causing the plates 60 and 61 to swing into engagement with the upper tapering portion of the cam 64 at the same time relieving the tension on the stock. The foregoing movement causes the strip pins 51 and 52 to protrude through the orifices in the corresponding angle plates and detach the stock from the pins 62.

As the unit continues its upward movement the pin 70 forces the arm 69 from the angle plate 68, as previously described, and the plates 54 and 55 snap back into their original positions, as shown in Fig. 9. This sudden movement of the angle plates serves to free the stock if it sticks to the pins 62.

Referring to Fig. 12, if desired a set screw 72 may be provided in the under face of the angle plate 54 to adjust the movement of the plate to the particular stock being cut, it being understood that the screw 72 bears against a portion of the frame 4, not shown.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. A cutting mechanism comprising a plurality of supports for strips of material to be severed arranged in substantial parallelism, a movable frame associated with said supports, a cutting unit mounted on said frame for co-operation with each of said supports, and means for moving said frame relative to said supports whereby the several cutting units are simultaneously brought into engagement with said strips on said supports and removed therefrom.

2. A cutting unit comprising a frame, a cutting blade supported by and movable relative to said frame, means for engaging and holding fabric relative to said blade, and locking means co-operating with said engaging and holding means.

3. In a cutting mechanism, a cutting unit comprising a frame, a cutting blade supported by the frame and movable relative thereto, means for engaging and holding fabric in co-operative relation to the cutting blade, and locking means for said engaging and holding means, said locking means comprising a member supported independently of said frame and actuating said locking means in response to relative movement between it and said frame.

4. A cutting unit comprising a movable frame, a cutting blade carried thereby, movable fabric gripping and holding means interposed between the frame and stock to be cut, and locking means for said gripping means operable in response to movement of said frame.

5. A cutting unit comprising a frame, a cutting blade carried thereby, stock gripping and holding means carried by the frame and extending between said frame and the stock to be severed for positioning the stock relative to said blade in accordance with the movement of said frame relative to the stock, and means for tensioning the stock along the line of cut.

6. A cutting unit comprising a frame, a cutting blade mounted thereon, a cam mounted on said frame, and material gripping plates pivotally mounted on said frame and extending into co-operative relation to said cam, whereby upon movement of said frame the plates are caused to engage said cam for movement relative to said frame to position material in co-operative relation to said cutting blade.

7. A cutting unit comprising a frame, a cutting blade extending from one face thereof, a material gripping plate normally extending between said frame and stock to be severed, a pivotal support for said plate carried by said frame, and means associated with said plate for locking it in definite relation to said frame in accordance with the movement of the frame.

8. A cutting unit comprising a frame having a substantially flat surface exposed to stock to be severed, a cutting blade carried by the frame, an L-shaped gripping member pivotally mounted on said frame and extending between the frame and said stock, means for resiliently urging said gripping means into a definite position, and locking means associated therewith for moving said gripping means relative to said frame to bring said stock into co-operative relation to said cutting means.

9. A cutting unit comprising a frame having a slot through which a cutting blade operates, said frame being movable relatively to the stock to be severed, a cutting blade carried by said frame, movable guide plates and stock gripping and holding pins carried by the frame on opposite sides of the slot and extending between said frame and the stock to be severed for positioning and tensioning the stock relative to the path of said blade in accordance with the movement of the frame relatively to the stock.

ADRIAN O. ABBOTT, Jr.